United States Patent [19]
Unruh et al.

[11] B 4,000,910
[45] Jan. 4, 1977

[54] VEHICLE PROVIDED WITH A FLUIDIC ACCELEROMETER

[75] Inventors: Dale H. Unruh; Frederick D. Proksch, both of Peoria, Ill.

[73] Assignee: Caterpillar Tractor Co., Peoria, Ill.

[22] Filed: Feb. 18, 1975

[21] Appl. No.: 550,810

[44] Published under the second Trial Voluntary Protest Program on March 23, 1976 as document No. B 550,810.

Related U.S. Application Data

[62] Division of Ser. No. 437,205, Jan. 28, 1974, Pat. No. 3,900,042.

[52] U.S. Cl. .............................. 280/710; 267/65 R
[51] Int. Cl.² ........................................ B60G 11/56
[58] Field of Search ............... 280/124 R, 124 F; 267/65 R, 65 D; 137/38, 39, 804, 805, 829

[56] References Cited

UNITED STATES PATENTS

| | | | |
|---|---|---|---|
| 2,992,837 | 7/1961 | Rabow | 280/124 F |
| 3,124,368 | 3/1964 | Corley | 280/124 F |
| 3,223,103 | 12/1965 | Trinkler | 137/83 |
| 3,500,846 | 3/1970 | Wood | 137/829 |
| 3,550,609 | 12/1970 | Roche | 137/83 |

Primary Examiner—Philip Goodman
Assistant Examiner—John A. Carroll
Attorney, Agent, or Firm—Phillips, Moore, Weissenberger, Lempio & Strabala

[57] ABSTRACT

A fluidic device senses acceleration of a vehicle or the like and may control a fluid motor or other mechanism which is to be actuated in response to acceleration. A nozzle directs a jet of fluid across an open gap in a direction transverse to the direction along which acceleration is to be sensed. Two receiver ports are positioned to receive and divide the fluid jet in the absence of flow deflection. Upon acceleration of the device, inertial effects cause the jet flow to be slightly deflected thereby changing the amount of flow received at one receiver port relative to the other to produce a fluidic signal. The signal may be amplified and caused to actuate a fluid motor. Compensating means are provided to eliminate signal error which might otherwise arise from tilting of the device or from changes in jet fluid viscosity.

1 Claim, 3 Drawing Figures

VEHICLE PROVIDED WITH A FLUIDIC ACCELEROMETER

This is a division of Ser. No. 437,205, filed Jan. 28, 1974.

BACKGROUND OF THE INVENTION

This invention relates to instruments for detecting acceleration and for producing signals in response thereto.

In various vehicles, as well as in other contexts, an instrument may be needed for sensing acceleration in one or more directions and for producing signals indicative of acceleration. Such an instrument may be used to activate some mechanism which is to be operated while a condition of acceleration exists. Considering a specific example, vehicles designed to travel over rough or uneven terrain often have wheels attached to the vehicle frame through resilient suspension systems to allow a wheel to travel over an obstacle without the upward motion being fully transmitted to the vehicle frame. This shock absorbing effect can be enhanced if a fluid cylinder is connected between the wheel and frame and if means are provided for sensing the vertical acceleration which accompanies passage of the wheel over an obstacle. The acceleration signal can be caused to actuate the fluid cylinder to forcibly lift the wheel relative to the frame enabling overriding of the obstacle with reduced upward movement of the frame itself. In other instances, typically found in earthworking vehicles, the operator's seat may have a fluid suspension in which fluid pressure is momentarily varied when upward or downward acceleration of the vehicle is sensed in order to reduce jarring of the operator when traveling over rough terrain. Many other forms of apparatus are known in which it is necessary to sense acceleration and to actuate some mechanism in response thereto.

The acceleration sensors heretofore employed for such purposes typically include a mass or weight suspended or supported by spring means. Due to inertial effects, any sudden acceleration of the structure surrounding the weight is accompanied by a lag in the movement of the weight itself. This relative movement between the surrounding structure and the weight is caused to actuate a slide valve which controls a fluid flow that in turn actuates a fluid motor or some other mechanism. Accelerometers of this kind are subject to the several difficulties inherent in the use of mechanical mechanism for performing sensitive detection functions. Such devices are necessarily bulky and are costly if manufactured to exhibit maximum precision. Sensitivity is limited by the friction between moving parts and there is a considerable risk of malfunctions from seizing, wearing and breakage of mechanical elements. Further, spring mass systems have inherent resonances which result in poor frequency response. In other words, a given spring mass system will oscillate much more strongly in response to acceleration at one particular rate or at harmonics thereof while being much less sensitive to acceleration at other rates.

To avoid the problems of mechanical accelerometers, fluidic devices have heretofore been designed in which acceleration is sensed from the deflection of a jet of fluid traveling across an open gap between a nozzle and one or more receiver ports. Jet deflection from acceleration causes pressure and flow changes at the receiver ports which are detected and amplified by fluidic circuit elements. As heretofore constructed, fluidic accelerometers have been subject to signal error from certain causes. For example, if such devices are operated in a tilted condition, gravitational deflection of the jet is changed with a resultant change in the output signal similar to what is produced by acceleration. Changes in the viscosity of the jet fluid from temperature changes may also cause an erroneous output signal by altering jet velocity and thereby altering gravitational drop of the jet in passage across the gap.

SUMMARY OF THE INVENTION

This invention is a highly accurate fluidic system for producing signals in response to acceleration. In particular, the system includes means inherently compensating for error which might otherwise result from tilting of the device or from fluid viscosity changes.

In one form of the invention, a fluid flow receiver has a pair of receiver ports with centers which are spaced apart in the direction along which acceleration is to be sensed. A nozzle directs a jet of fluid under pressure across an open gap and is positioned whereby the flow is divided between the two receiver ports in a predetermined ratio in the absence of acceleration. Upon acceleration, inertial effects cause the flow across the open gap to be deflected at least momentarily thereby altering the normal flow division between the two receiver ports to produce the desired acceleration signal.

Compensation for changes in gravitational deflection of the jet, as a result of inclination of the device or viscosity variation, is provided for by a valve situated between the jet nozzle and a source of fluid at constant pressure. The compensation valve is controlled by feedback of the output signal of the accelerometer to adjust jet flow to restore the output signal to a predetermined value if a slow change in the output signal occurs. Relatively fast changes in the output signal, which arise from acceleration rather than other causes, do not significantly shift the compensator valve.

In one form of the invention, the flow differential signal from the receiver ports that indicates acceleration is fluidically amplified and caused to pilot a valve which in turn controls mechanism, such as a fluid cylinder in a vehicle wheel suspension, which is to be actuated in response to acceleration.

Accordingly, it is an object of this invention to provide a more precise and reliable fluidic accelerometer for detecting acceleration and for producing a signal in response thereto.

The invention, together with further objects and advantages, thereof, will best be understood by reference to the folowing description of a preferred embodiment taken in conjunction with the accompanying drawings.

DESCRIPTION OF A PREFERRED EMBODIMENT

Figure 1:
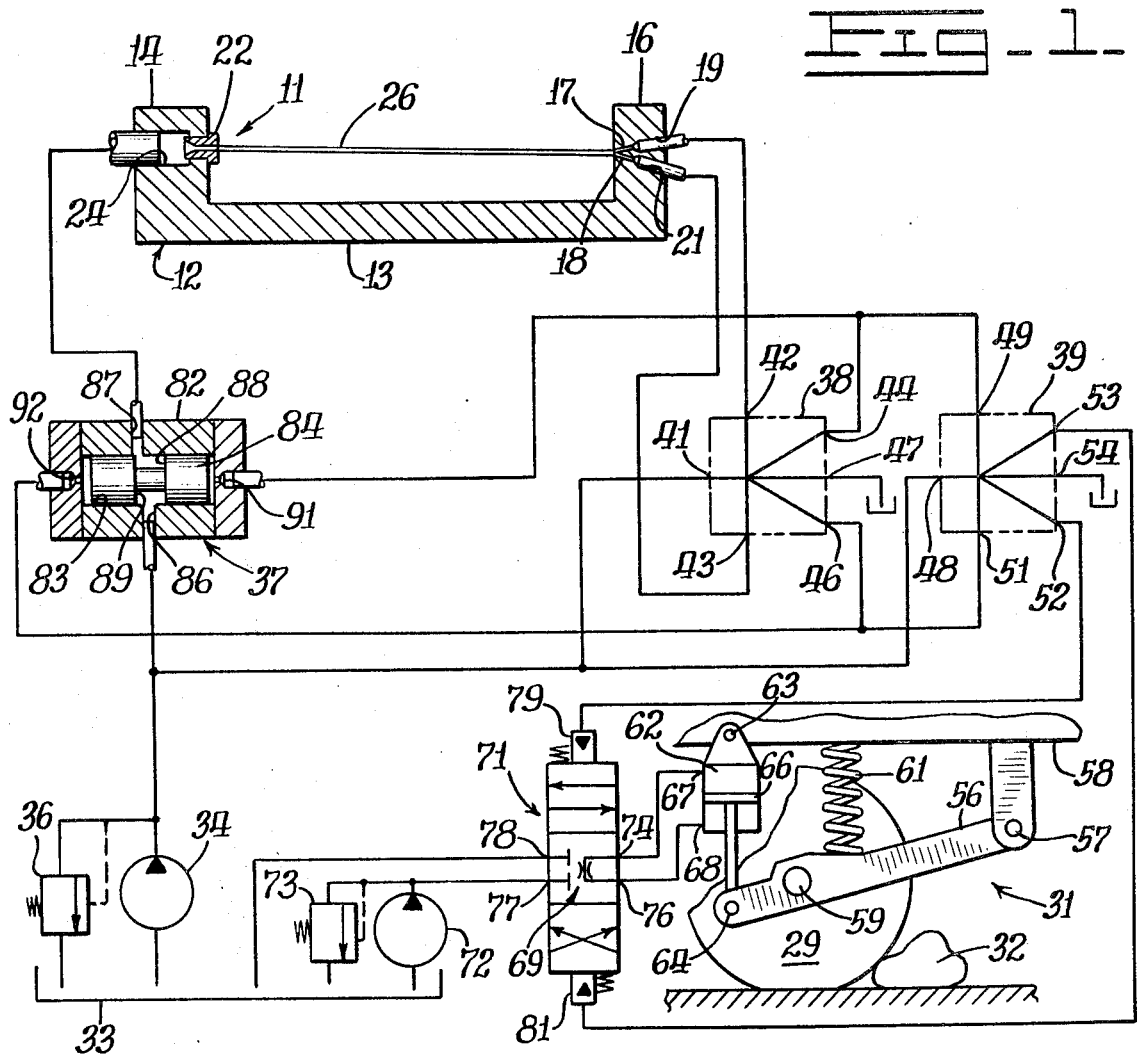
FIG. 1 is a section view of a fluidic acceleration sensing device together with other fluid circuit elements for controlling a fluid motor in a vehicle suspension wherein certain of the fluid circuit elements are shown schematically.

Referring initially to FIG. 1 of the drawing, an acceleration sensing device 11 in accordance with the invention may have a support means or base 12 which in this particular example has a broad U-shaped configuration consisting of a flat floor 13 with an upstanding nozzle endwall 14 at one end and an upstanding receiver endwall 16 at the other end. In this particular example, it is desired to sense acceleration in a vertical direction, both upwardly and downwardly, and accordingly, the device 11 is disposed with the floor 13 extending in a horizontal plane.

Figures 2, 3:
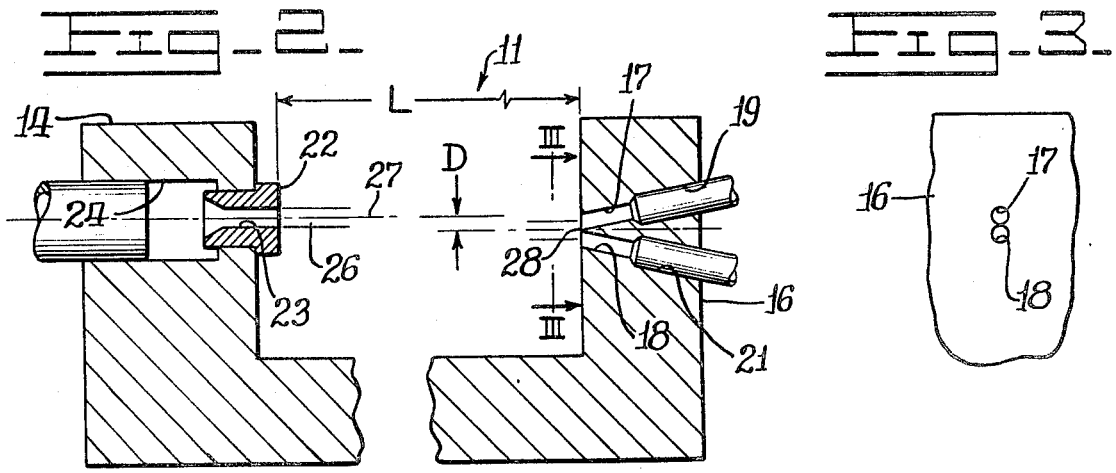
FIG. 2 is a foreshortened enlarged section view of the acceleration sensing device of FIG. 1.
FIG. 3 is a view taken along line III—III of FIG. 2 further clarifying the relationship of certain fluid ports illustrated therein.

Referring now to FIGS. 2 and 3 in conjunction, upper and lower receiver ports 17 and 18 respectively are situated at the inner face of receiver endwall 16, the two receiver ports being circular in this example and being tangent to each other at the inner surface of the endwall. A stepped upper output passage 19 extends through endwall 16 to connect with upper port 17 while a stepped lower output passage 21 extends through the endwall to connect with lower port 18, the passages 19 and 21 being divergent within the endwall.

A nozzle element 22 having a jet forming flow orifice 23 is disposed at the inner surface of the opposite endwall 14. A passage 24 for receiving pressurized fluid extends through the endwall 14 to communicate with the nozzle orifice 23. Nozzle orifice 23 may have a diameter substantially equivalent to that of an individual one of the receiver ports 17 and 18 and is positioned vertically relative to the receiver ports whereby the fluid jet 26 emerging from the nozzle crosses the gap L between the nozzle and receiver ports and impacts upon the opposite endwall 16 in position to be divided equally between the two receiver ports 17 and 18 in the absence of upward or downward acceleration of the device 11. Since the fluid jet 26 travels in a substantially horizontal direction, some downward deflection of the jet 26 occurs in passage across the gap L due to gravity. This may be compensated for by situating the centerline 27 of nozzle orifice 23 at a level higher than that of the point of tangency 28 of the receiver ports 17 and 18, the amount of this displacement D being determined by the length of the gap L and the jet velocity. Gravitational drop may also be compensated for by directing the centerline 27 of nozzle orifice 23 slightly upward relative to horizontal.

Accordingly, in the absence of upward or downward acceleration of the device 11, the fluid jet 26 from nozzle 22 is received by ports 17 and 18 and divided equally therebetween. Thus, in the absence of acceleration, equal flows and equal pressures occur in the two outlet passages 19 and 21. Should the device 11 be accelerated upwardly, inertial effects cause the fluid which is travelling across the gap L to lag begind such motion and the point of impact of the jet 26 on receiver endwall 16 is displaced towards port 18. Under this condition, fluid flow and pressure in outlet port 21 rises while the flow and pressure in port 19 drops by an amount dependent on the extent of the jet deflection and thus on acceleration rate. Accordingly, a fluidic signal indicative of acceleration is produced which may be used to indicate such acceleration or to actuate mechanism as will hereinafter be described.

Conversely, if the device 11 undergoes downward acceleration, inertial effects on the jet 26 cause the flow and pressure in outlet port 19 to rise while the flow and pressure in outlet passage 21 drops. Thus, the device 11 produces a fluidic signal indicative of acceleration in either the upward or downward direction and such signals are distinguishable from each other.

The output signals thus generated by the device 11 may be caused to actuate an acceleration indicator or may be transmitted to an analyzing instrument or may be amplified and used to actuate mechanism which is to be operated in the presence of acceleration. One example of a mechanism of this kind is depicted diagrammatically in FIG. 1. Specifically, a vehicle wheel 29 and certain elements of the wheel suspension 31 are shown wherein mechanism controlled by the device 11 acts to reduce road shocks which may occur if the wheel passes over an obstacle such as a large rock 32.

Referring to FIG. 1, fluid under pressure is supplied to the nozzle 22 from a suitable reservoir 33 by a first pump 34. As the device 11 operates from inertial effects on the jet 26, it is usually preferable to employ a heavy hydraulic fluid such as oil, for example, to enhance response although it will be apparent that pneumatic fluids may be employed if desired. A relief valve 36 is connected between the outlet of pump 34 and reservoir 33 to maintain a constant predetermined outlet pressure. The pressurized fluid from the outlet of pump 34 is transmitted to the nozzle supply passage 24 of the device 11 through a compensator valve 37 which will hereinafter be described in more detail.

While the signals generated in output passages 19 and 21 may be of sufficient strength for direct utilization in some instances, it is frequently necessary that such signals be amplified. In this example, two stages of amplification are provided by first and second fluidic proportional amplifiers 38 and 39 respectively. Amplifier 38 may be of the known form having a supply port 41 which is connected to the output of pump 34, and having a pair of control ports 42 and 43, which are connected to receiver passages 19 and 21 respectively of device 11, and further having a pair of output ports 44 and 46 and a vent port 47. The second stage amplifier 39 may be of the same form and has a supply port 48 connected to the outlet of pump 34, a pair of control ports 49 and 51 respectively connected to output ports 44 and 46 of amplifier 38, a pair of output ports 52 and 53 and vent port 54. At any given time, a pressure and flow differential is present between the output ports 52 and 53 of amplifier 39 which is proportional to the pressure and flow differential at receiver ports 17 and 18 of device 11 but the differential is of substantially greater magnitude and thus is more readily capable of operating mechanisms which are to be actuated in the presence of acceleration. As previously described, this pressure and flow differential is normally zero but in the presence of upward acceleration of device 11, pressure and flow at amplifier output 52 rises while the pressure and flow at output 53 decreases in an amount which is a function of the rate of acceleration. A reversed change of pressures and flow at the two amplifier outlets 52 and 53 occurs in the presence of downward acceleration of the device 11.

Considering now one example of mechanism which may be controlled by the acceleration signals from amplifier output ports 52 and 53, the vehicle wheel suspension system 31, may consist of a strut 56 having a pivot connection 57 to a frame member 58 of the vehicle and which extends backward from the pivot connection. The wheel 29 may be attached to the vehicle through an axle 59 journaled in a rearward portion of the strut whereby the wheel is able to pivot upward and downward relative to the vehicle frame while passing over irregularities such as rock 32. To maintain in the wheel 29 at a normal level relative to frame 58, a suspension spring 61 may be disposed between the strut 56 and vehicle frame 58. As is well understood in the art, such a resilient suspension aids in reducing the transmission of road shocks to the frame of the vehicle 58 does not wholly eliminate undesirable upward and downward motion of the vehicle frame. The present suspension system further aids in reducing upward and downward motion of the frame 58 under such conditions by means of a double acting hydraulic jack or cylinder 62 coupled between the frame member 63 and the back end of strut 56 through pivot joints 63 and 64 respectively. Cylinder 62 is proportioned so that the piston 66 thereof is normally centered within the cylinder by spring 61 when the vehicle is traveling on a smooth surface. The ports 67 and 68 of cylinder 62 are, except under conditions to be hereinafter described, intercommunicated through a flow restriction 69 in a cylinder control valve 71 and thus the cylinder normally provides a shock absorber effect by dampening but not prohibiting pivoting movement of the strut 56 and reduces oscillation of the strut and wheel from energy stored in spring 61 following such pivoting.

Pressurized fluid for operating the cylinder 62 is provided from reservoir 33 by a second pump 72 having a pressure relief valve 73 connected to the outlet thereof to maintain a constant outlet pressure. Control valve 71 has a pair of ports 74 and 76 respectively connected to ports 67 and 68 of the cylinder 62 and has an additional pair of ports 77 and 78 respectively connected to pump 72 and reservoir 33. Valve 71 is spring biased to a normal position at which ports 77 and 78 are blocked while ports 74 and 76 are communicated through the flow restriction 69 as previously described. Application of fluid pressure to a first pilot means 79 urges the valve toward a second position at which port 77 is communicated with cylinder port 68 while drain port 78 of the valve is communicated with cylinder port 67 thereby tending to contact the cylinder and to pivot strut 56 and wheel 29 upward relative to frame 58 while compressing the spring 61. Application of fluid pressure to an opposite pilot means 81 of valve 71 acts to urge the valve towards a third position at which supply port 77 is communicated with cylinder port 67 while cylinder port 68 is communicated to drain port 78 thereby extending the cylinder 62 to pivot strut 56 and wheel 29 downwardly while distending spring 61.

Pilot means 79 and 81 of the control valve are connected to outputs 52 and 53, respectively, of the second stage fluidic amplifier 39. Accordingly, in operation, any initial upward motion of the wheel 29 is sensed by device 11 and amplified by amplifiers 38 and 39 causing the pressure at valve pilot means 79 to rise while the pressure at pilot means 81 decreases. Control valve 71 is thereby shifted towards the first position at which high pressure fluid is transmitted to cylinder port 68 while the opposite cylinder port 67 is vented. The resultant cylinder contraction forcibly drawn the wheel 29 closer to vehicle frame 58 enabling the wheel to override the obstacle 32 without imparting a violent upward motion to the vehicle frame. When upward motion due to the obstacle 32 ceases, the fluid pressures at pilot means 79 and 81 again equalize and valve 71 is returned to the normal position at which spring 61 may restore the wheel 29 and piston 66 to the normal positions relative to frame 58.

Should the wheel 29 drop into a sudden depression in the underlying surface, an opposite operation occurs. Device 11 senses the initial downward motion causing an increased pressure to be applied to pilot means 81 while the pressure at pilot means 79 is decreased and valve 71 therefore shifts towards the position at which cylinder 62 extends to forcibly lower the wheel 29 relative to frame 58. Thus the end effect of the system is to assist the wheel 29 to rise and drop substantially independently of vehicle frame 58 as necessary to traverse irregularities in the underlying surface.

Analysis of the above-described system will show that precision of operation depends on the jet flow 26 of device 11 traversing the gap L at a predetermined velocity and further depends on the gravity induced drop of the jet in passage across the gap being of a constant amount. These two considerations are interrelated. If the jet velocity should decrease, a longer time is required to cross the gap and thus gravitational drop will increase thereby disturbing the desired relationship between the amount of flow which enters the two receiver ports 17 and 18. Basically, emission of the jet from nozzle 22 at a constant velocity is provided for by the relief valve 36 which maintains a constant output pressure from pump 34. However, the velocity of the jet 26 is sensitive to another factor, specifically the viscosity of the fluid and viscosity can be altered by ambient temperature changes or other factors. Another factor which could disturb the pre-established relationship between the position of the receiver ports 17 and 18 and the jet 26 is tilting of the device 11 away from a strictly horizontal plane. In certain applications, such as in the vehicle suspension system described above, such tilting can readily occur, since the vehicle may travel on sloping terrain. When the device 11 is strictly horizontal, gravitational force acts on the jet 26 substantially at right angles thereto and this is the condition for which the level of the receiver ports 17 and 18 relative to nozzle 22 is preadjusted as previously described. If receiver end 16 of the device should then be tilted upward relative to the nozzle end 14, gravitational force then has a component pulling backward on the jet as well as at right angles thereto and thus tends to decrease jet velocity thereby causing more of the flow to enter lower receiver port 18 than enters upper receiver port 17. Conversely, should nozzle end 14 be tilted upward relative to receiver end 16, gravitational force has a component tending to accelerate the jet and the result is that more of the flow will enter the upper port 17 than enters the lower port 18. Thus, if uncorrected, tilting of the device 11 would degrade the precision of the acceleration signals produced at receiver passages 19 and 21.

Compensator valve 37 is provided to correct automatically for both viscosity changes and tilting of the device 11 so that extreme accuracy in the acceleration signals is maintained. Compensator valve 37 has a valve body 82 with a bore 83 in which a spool 84 is slidable. A passage 86 leading to bore 83 receives the fluid from pump 34 while a slightly offset outlet passage 87 transmits such fluid to the nozzle supply passage 24 of device 11. Spool 84 has a central groove 88 with an edge 89 for regulating the flow of such fluid to the device 11 in accordance with the position of spool 84 in bore 83. A constricted flow passage 91 at one end of bore 83 is connected to outlet port 44 of first amplifier 38 while a similar constricted flow passage 92 at the other end of bore 83 is communicated with outlet port 46 of amplifier 38.

If the jet flow 26 at device 11 divides evenly between receiver ports 17 and 18, the output pressure from first amplifier ports 44 and 46 are equal and are transmitted to opposite ends of compensator valve spool 84 to center the spool in bore 83 thereby causing a predetermined normal pressure to be transmitted to the nozzle 22 of device 11. Should lower receiver port 18 receive more flow than the upper receiver port 17 for any continued length of time, either from a viscosity related decrease in the volocity of the jet 26 or from an uptilting of end 16 of the device, amplifier 38 supplies a greater pressure to constricted passage 91 of the compensator valve than is provided to the opposite constricted passage 92, and spool 84 is shifted a proportionate amount to increase the fluid pressure at nozzle 22. This restores the desired equal division of flow between receiver ports 17 and 18. Similarly, should upper receiver port 17 receive more flow than lower receiver port 18 for a continued period because of a viscosity reduction or an uptilting of end 14 of the device, than a greater pressure is supplied to compensator valve spool passage 92 while a lesser pressure is supplied to passage 91. Spool 84 is thereby shifted to reduce the pressure at nozzle 22 to restore the desired relationship. The compensator valve 37 does not significantly counteract the desired acceleration signals because of the fact that the spool piloting passages 91 and 92 are constricted to block rapid pressure changes from the spool. Thus the compensator valve cannot respond to the brief pressure differentials at amplifier outputs 44 and 46 which are generated by acceleration, but can only respond to the more prolonged alteration of the jet 26 which occurs in the presence of viscosity changes or tilting.

While the invention has been described with respect to a single embodiment, it will be apparent that many variations are possible, and it is not intended to limit the invention except as defined in the following claims;

What is claimed is:

1. In a vehicle having a fluidic system disposed on said vehicle for detecting acceleration and for producing an acceleration signal in response thereto, the combination comprising:
    a vehicle wheel, suspension means for attaching said wheel to said vehicle while providing for vertical movement of said wheel relative to said vehicle, resilient means for exerting a force between said vehicle and said suspension means for urging said wheel towards a predetermined vertical position relative to said vehicle, an extensible and contractible fluid cylinder coupled between said vehicle and suspension means,
    fluid flow receiver means having a first flow receiver port, and a second flow receiving port with the center of said second flow receiving port being spaced apart from the center of said first flow receiving port in the direction along which acceleration is to be sensed,
    fluid jet forming nozzle means having a flow orifice,
    means for supplying fluid under pressure to said nozzle means whereby a fluid jet is ejected therefrom,
    support means holding said nozzle means in a spaced-apart relationship from said receiver means with said jet being directed towards said receiver ports across an unobstructed gap, whereby deflection of said fluid jet relative to said receiver means in response to acceleration is accompanied by an increase of flow through one of said ports and a decrease of flow through the other thereof,
    fluidic signal output means communicated with said receiving ports for generating fluidic signals in response to brief departures of the pressure at said receiving ports from a predetermined value,
    a fluid pressure piloted cylinder control valve connected between said cylinder and a source of high pressure fluid and having a normal position at which said cylinder is isolated from said source of high pressure fluid, said control valve having a first pilot means for responding to a relative increase of fluid pressure at said first receiving port by supplying high pressure fluid to said cylinder to raise said wheel relative to said vehicle and having second pilot means responsive to a relative increase of fluid pressure at said second receiving port by supplying high pressure fluid to said cylinder to lower said wheel relative to said vehicle, and
    compensating means for varying the flow passage to said jet nozzle to restore said receiver port pressures to said predetermined value in response to relatively prolonged departures of said pressures from said predetermined value.

* * * * *